United States Patent
Chen et al.

(10) Patent No.: US 9,611,944 B2
(45) Date of Patent: Apr. 4, 2017

(54) TWO-ROUTE SWITCHING WATER OUTPUT SYSTEM

(71) Applicant: Xiamen Runner Industrial Corporation, Xiamen (CN)

(72) Inventors: Xi-Min Chen, Xiamen (CN); Xian-Hai Lin, Xiamen (CN); Rong-Gui Zhang, Xiamen (CN)

(73) Assignee: XIAMEN RUNNER INDUSTRIAL CORPORATION, Xiamen (CN)

( * ) Notice: Subject to any disclaimer, the term of this patent is extended or adjusted under 35 U.S.C. 154(b) by 0 days.

(21) Appl. No.: 14/846,062

(22) Filed: Sep. 4, 2015

(65) Prior Publication Data

US 2016/0090721 A1 Mar. 31, 2016

(30) Foreign Application Priority Data

Sep. 30, 2014 (CN) .......................... 2014 1 0517747

(51) Int. Cl.
| | |
|---|---|
| *F16K 31/122* | (2006.01) |
| *E03C 1/02* | (2006.01) |
| *F16K 11/02* | (2006.01) |
| *E03C 1/08* | (2006.01) |
| *E03B 7/07* | (2006.01) |

(52) U.S. Cl.
CPC ................ *F16K 11/02* (2013.01); *E03B 7/07* (2013.01); *E03C 1/023* (2013.01); *E03C 1/08* (2013.01); *F16K 31/1223* (2013.01); *E03C 2201/30* (2013.01); *Y10T 137/2514* (2015.04); *Y10T 137/268* (2015.04)

(58) Field of Classification Search
CPC ........ E03C 1/08; E03C 2201/30; E03C 1/023; E03B 7/07; E03B 7/075; F16K 11/02; F16K 31/1223; Y10T 137/268; Y10T 137/2514; Y10T 137/2516; Y10T 137/2519; Y10T 137/2521; Y10T 137/2683; Y10T 137/2623; Y10T 137/87161; Y10T 137/87153; Y10T 137/2665; Y10T 137/2663
See application file for complete search history.

(56) References Cited

U.S. PATENT DOCUMENTS

| | | | | |
|---|---|---|---|---|
| 1,986,206 | A | * | 1/1935 | Walker ................ F16K 31/1223 137/625.26 |
| 2,090,843 | A | * | 8/1937 | King ...................... G05D 16/10 137/494 |

(Continued)

*Primary Examiner* — Kevin Murphy
*Assistant Examiner* — David Colon Morales
(74) *Attorney, Agent, or Firm* — Chun-Ming Shih

(57) ABSTRACT

A two-route switching water output system includes a water input converter and a water output device. The water input converter includes a water input valve body and a valve cock. In the water input valve body is provided with a first water input route and a second water input route. One of the first water input route and the second water input route is selected to open or close through the valve cock. The water output device includes a water output valve body and a control valve core. Inside the water output valve body is provided with a first water output route and a second water output route. The first water input route and the first water output route are connected to form a first water route. The second water input route and the second water output route are connected to form a second water route.

8 Claims, 9 Drawing Sheets

(56) References Cited

U.S. PATENT DOCUMENTS

| | | | | |
|---|---|---|---|---|
| 2,470,471 | A * | 5/1949 | Carleton | F16K 15/063 137/513 |
| 2,593,701 | A * | 4/1952 | Sanford | G05D 23/1313 137/506 |
| 2,949,933 | A * | 8/1960 | Moen | F16K 3/18 137/119.08 |
| 2,973,001 | A * | 2/1961 | McAuley | C02F 1/42 137/118.06 |
| 2,990,840 | A * | 7/1961 | Snow | G05D 23/1313 137/630.14 |
| 3,317,181 | A * | 5/1967 | Robbins, Jr. | F16K 31/1223 251/63.4 |
| 3,570,517 | A * | 3/1971 | Odenthal | F15B 11/02 137/87.06 |
| 3,742,970 | A * | 7/1973 | Gross | F15B 20/005 116/268 |
| 4,609,006 | A * | 9/1986 | Parkison | E03C 1/04 137/119.04 |
| 4,610,264 | A * | 9/1986 | Georgiev | A01G 25/162 137/110 |
| 4,926,897 | A * | 5/1990 | Perrott | F16K 11/0746 137/98 |
| 5,205,313 | A * | 4/1993 | Moretti | F16K 35/14 137/112 |
| 5,823,229 | A * | 10/1998 | Bertrand | B01D 35/043 137/549 |
| 5,884,653 | A * | 3/1999 | Orlandi | G05D 23/1313 137/100 |
| 6,093,313 | A * | 7/2000 | Bovaird | B01D 35/04 137/551 |
| 6,135,154 | A * | 10/2000 | Chen | B01D 35/04 137/625.29 |
| 6,394,124 | B1 * | 5/2002 | Wu | F16K 11/02 137/119.04 |
| 6,978,795 | B2 * | 12/2005 | Perrin | F16K 11/048 137/119.04 |
| 7,000,854 | B2 * | 2/2006 | Malek | B05B 1/1618 137/625.48 |
| 7,077,153 | B2 * | 7/2006 | Segien, Jr. | E03C 1/04 137/119.01 |
| 7,494,074 | B2 * | 2/2009 | Benstead | B05B 1/1618 239/11 |
| 7,909,269 | B2 * | 3/2011 | Erickson | B05B 1/1618 137/801 |
| 2003/0102256 | A1 * | 6/2003 | Takagi | B01D 35/04 210/101 |
| 2005/0145554 | A1 * | 7/2005 | Cunningham | C02F 1/281 210/282 |
| 2010/0012197 | A1 * | 1/2010 | Liu | E03C 1/023 137/119.04 |
| 2010/0155639 | A1 * | 6/2010 | Zhou | B05B 1/1609 251/213 |
| 2011/0030823 | A1 * | 2/2011 | Seal | E03C 1/04 137/603 |
| 2013/0153039 | A1 * | 6/2013 | Deubler | F16K 31/122 137/1 |
| 2013/0167959 | A1 * | 7/2013 | Zhou | F16K 11/168 137/625.48 |
| 2013/0327431 | A1 * | 12/2013 | Zhou | B05B 1/1609 137/861 |
| 2014/0054484 | A1 * | 2/2014 | Chang | F16K 1/34 251/318 |
| 2014/0250586 | A1 * | 9/2014 | Zhadanov | B05B 1/16 4/615 |

* cited by examiner

TWO-ROUTE SWITCHING WATER OUTPUT SYSTEM

BACKGROUND OF THE INVENTION

Field of the Invention

The present invention relates to a push-pull head of a push-pull type water faucet, and in particular to a two-route switching water output system.

The Prior Arts

Presently, the push-pull type water faucet is used only for outputting faucet water, however, in case faucet water and purified water are required at the same time, then a complicated water output switching device is required to perform switching. In this respect, switching is done through closing down or opening up the respective water input tubes, rather than through controlling the push-pull head.

Therefore, presently, the design and performance of the pull-push type water faucet is not quite satisfactory, and it has much room for improvement.

SUMMARY OF THE INVENTION

In view of the problems and drawbacks of the prior art, the present invention provides a two-route switching water output system, to overcome the shortcomings of the prior art.

A major objective of the present invention is to provide a two-route switching water output system, that is simple in construction, novel in design, and easy to control. As such, it can not only achieve water output of one water output route by combining two different water input routes, but it can also control switching of two water routes through opening or closing one of the two water routes by means of feedback.

In order to achieve the objective mentioned above, the present invention provides a two-route switching water output system, comprising: a water input converter and a water output device. The water input converter includes a water input valve body and a valve cock. In the water input valve body is provided with a first water input route and a second water input route. One of the first water input route and the second water input route is switched to open or close through the valve cock. The water output device includes a water output valve body and a control valve core. Inside the water output valve body is provided with a first water output route and a second water output route. The first water input route and the first water output route are connected and in communication with each other to form a first water route. The second water input route and the second water output route are connected and in communication with each other to form a second water route. The first water output route is kept open, while the open and close of the second water output route is controlled by the control valve core. The position of the valve cock is regulated by the water output device through feedback of water pressure in the second water route. When the second water output route is cut off by the control valve core, the valve cock is pushed by the water pressure in the second water output route to move upward, to open first water input route. When the second water output route is opened by the control valve core, the valve cock is pushed by the water pressure in the first water input route to move downward, to close first water input route.

Preferably, the first water input route is formed by a first water input channel on the upper portion of the water input valve body, and a first middle water output channel; while the second water input route is formed by a second water input channel on the lower portion of the water input valve body, and a second middle water output channel. The valve cock is placed between the first middle water output channel and second middle water output channel, connected and in communication with each other. When the valve cock is at the position of the upper stop point, the first water input channel and the first middle water output channel are connected and in communication with each other.

Preferably, on the upper end of the valve cock is provided with a first protrusion ring portion, that is provided with a first ring slot. In the first ring slot is provided with a first O-shape seal ring separating and blocking the first water input channel and the first middle water output channel. In the central portion of the valve cock is provided with a central protrusion ring portion, in which is provided with a central ring slot. In the central ring slot is provided with a central O-shape seal ring separating and blocking the first middle water output channel and the second middle water output channel. The cross section of the central protrusion ring portion is greater than that of the first protrusion ring portion.

Preferably, at the water input end of the water output valve body is provided with a first middle water input channel and the second middle water input channel. At the water output end of the water output valve body is provided with a first water output channel and a second water output channel. On the water output valve body is provided with a valve slot. The first middle water input channel is connected to and in communication with first water output channel through a valve slot, to form the first water output route. The second middle water input channel is connected to and in communication with the second water output channel through a valve slot, to form the second water output route. The control valve core is disposed in the valve slot, to control the open and close of the second water output route, while keeping the first water output route connected.

Preferably, at the water input end of the water output valve body is provided with a first middle water input channel and the second middle water input channel. At the water output end of the water output valve body is provided with a first water output channel and a second water output channel. On the water output valve body is provided with a first valve slot and a second valve slot. The first middle water input channel is connected to and in communication with first water output channel through a first valve slot, to form the first water output route. The second middle water input channel is connected to and in communication with the second water output channel through a second valve slot, to form the second water output route. The control valve core is disposed in the second valve slot, to control the open and close of the second water output route.

Preferably, the first water output channel includes the concentrically disposed first inner water output channel and the first outer water output channel. In the first valve slot is disposed a switch valve core, for controlling selection of one of the following to connect: the first middle water input channel, the first inner water output channel, and the first outer water output channel.

Preferably, the second middle water input channel is disposed in the first middle water input channel.

Preferably, the water input converter is connected to the water output device through a water input tube. The water input tube includes an inner tube, and an outer tube sleeved around the inner tube. In a cavity between the inner tube and the outer tube is formed a first water transport channel. The cavity in the inner tube is formed into a second water transport channel. The first water input route is connected to the first water output route through the first water transport channel, while the second water input route is connected to the second water output route through the second water transport channel.

Preferably, around the outer perimeter at each of the two ends of the outer tubes is provided with a connection sleeve. In the connection sleeve is provided with a water dividing valve core at the end portion of the outer tube. In the center of the water dividing valve core is provided with through holes penetrating the inner tube to form tight seal fit with the inner tube. After penetrating the through holes, the inner tube is inserted into the second middle water input channel to form tight seal fit. Around the perimeter of the water dividing valve core is provided with a water output port connected to the first water transport channel and first middle water input channel.

Preferably, the first water route is used for faucet water, while the second water route is used for purified water.

Compared with the Prior Art, two-route switching water output system of the present invention has the following advantages: compact in construction, novel in design, and easy to control and operate. As such, it can realize the output water switching of two different water routes, such as faucet water route and purified water route. Wherein, the first water output route of the water output device is kept open, while the open or close of the second water output route is controlled by a control valve core. When the second water output route is closed, the water pressure feedback is used to control the valve cock of the water output converter to move upward, to switch to the first water input route to input water, and the first water output route to output water. When the second water output route is connected and open, due to release of pressure, the valve cock of the water output converter moves downward to switch to the second water input route to input water, and the second water output route to output water, in achieving the objective of switching the output water for two water input routes.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

Figure 1:
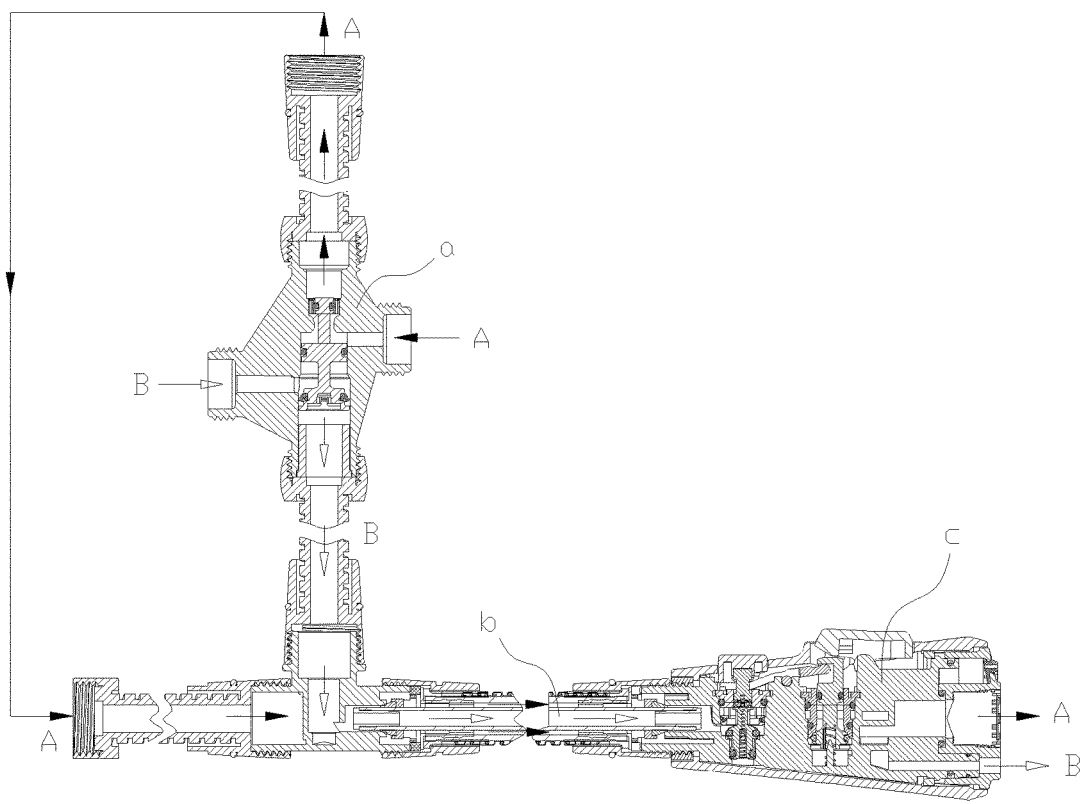
FIG. 1 is a schematic diagram of a two-route switching water output system according to the first embodiment of the present invention.
Figure 2:
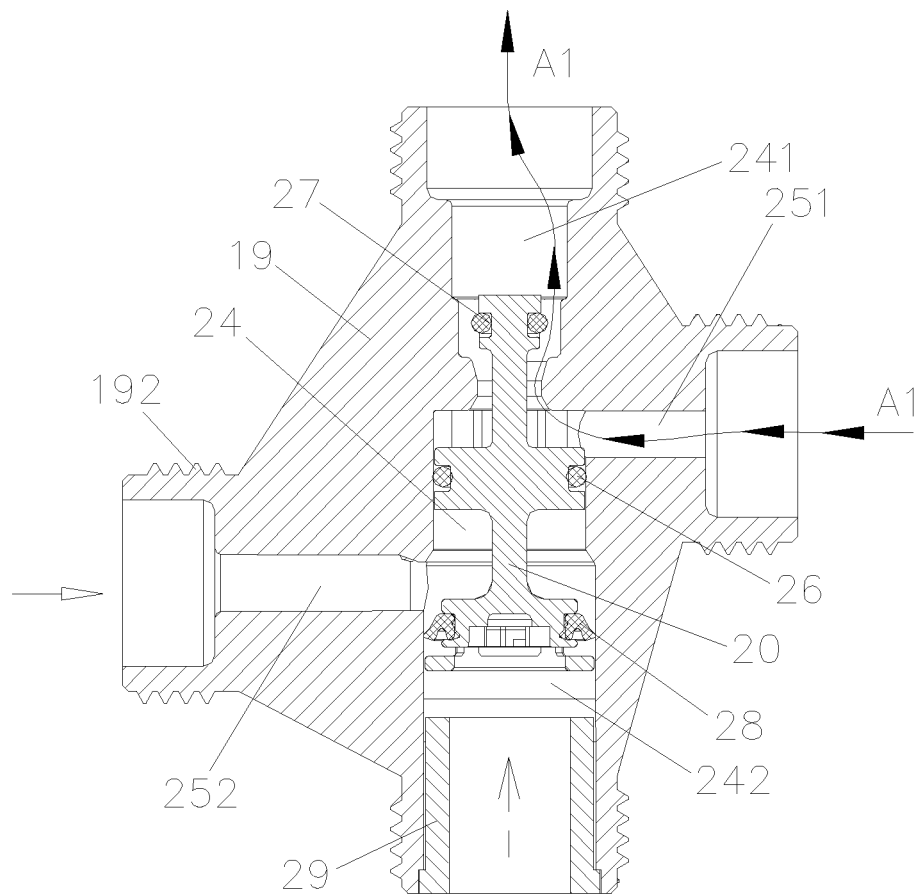
FIG. 2 is a schematic diagram of water flow of the first water input route of a water input converter according to the present invention.
Figure 3:
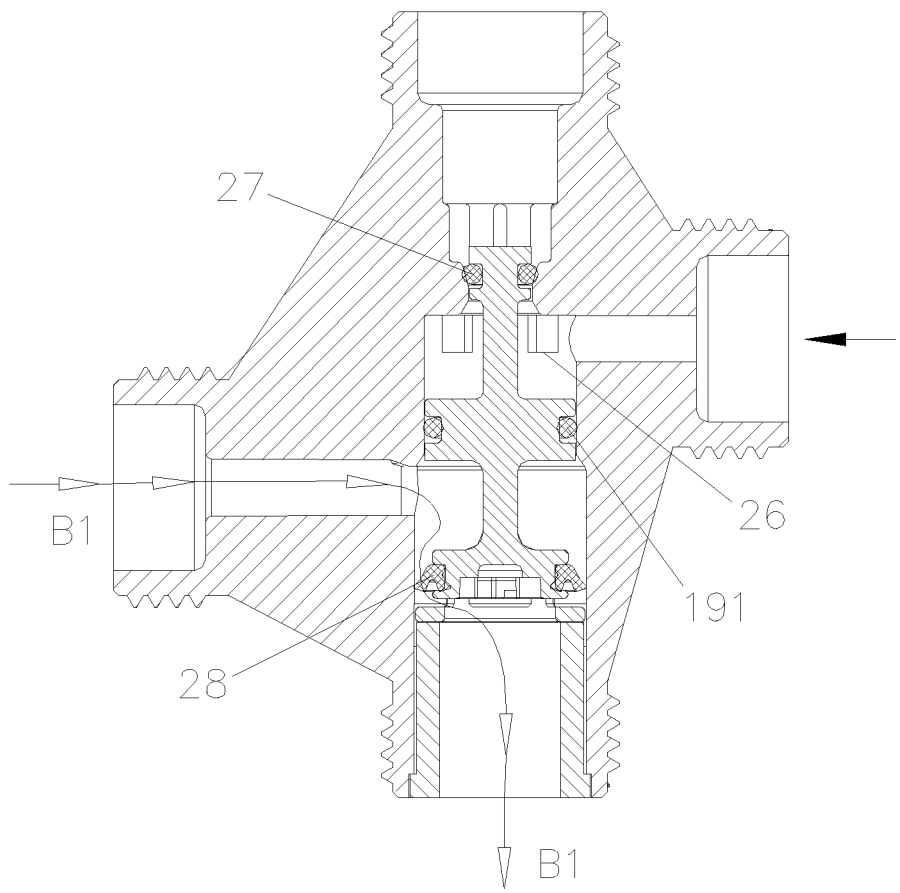
FIG. 3 is a schematic diagram of water flow of the second water input route of a water input converter according to the present invention.
Figure 4:
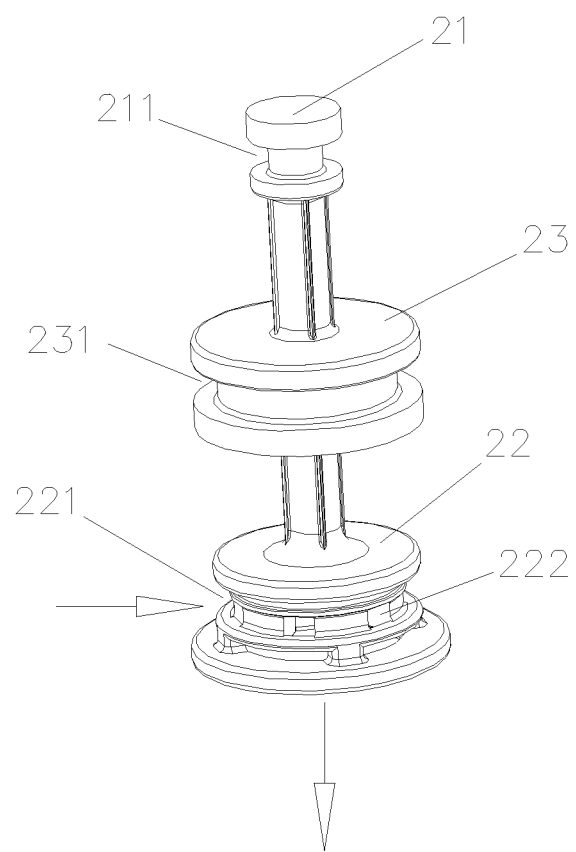
FIG. 4 is a schematic diagram of a valve cock of a water input converter according to the present invention.
Figure 5:
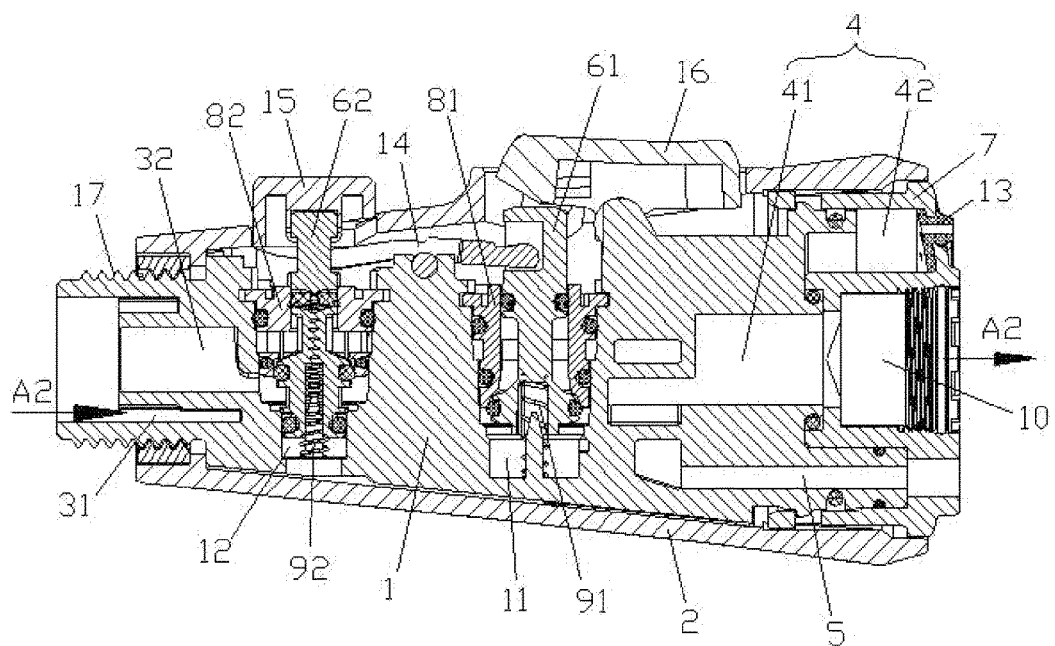
FIG. 5 is a schematic diagram of a first water output route of a water output device outputting water according to the first embodiment of the present invention.
Figure 6:
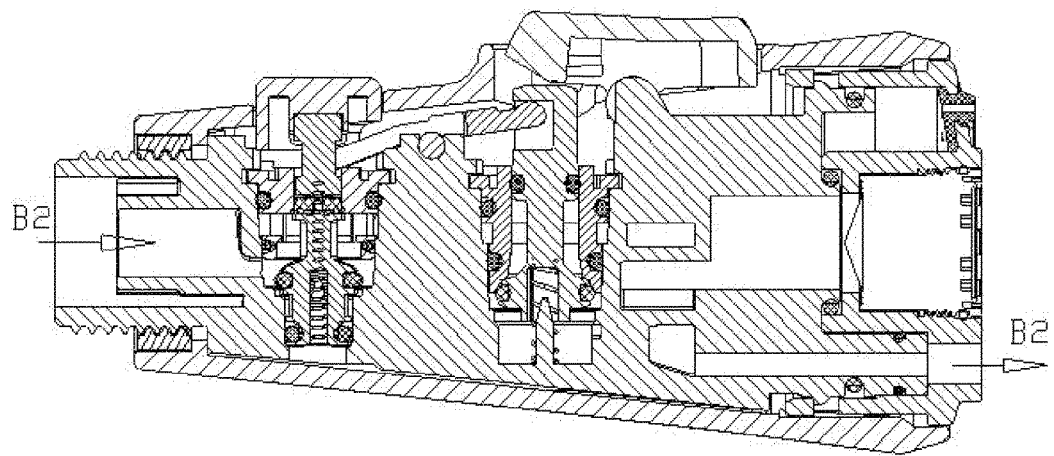
FIG. 6 is a schematic diagram of a second water output route of a water output device outputting water according to the first embodiment of the present invention.
Figure 7:
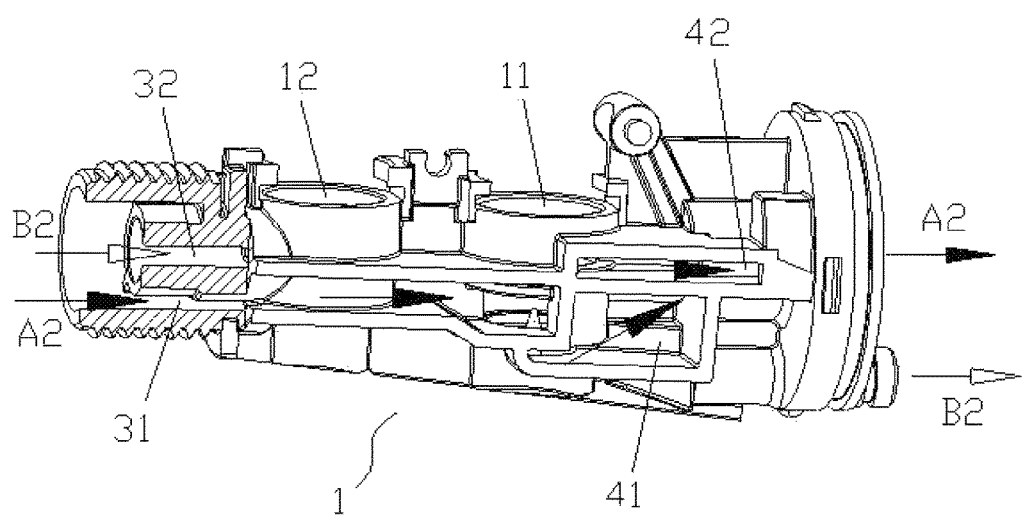
FIG. 7 is a front view of a water output valve body of a water output device according to the first embodiment of the present invention.
Figure 8:
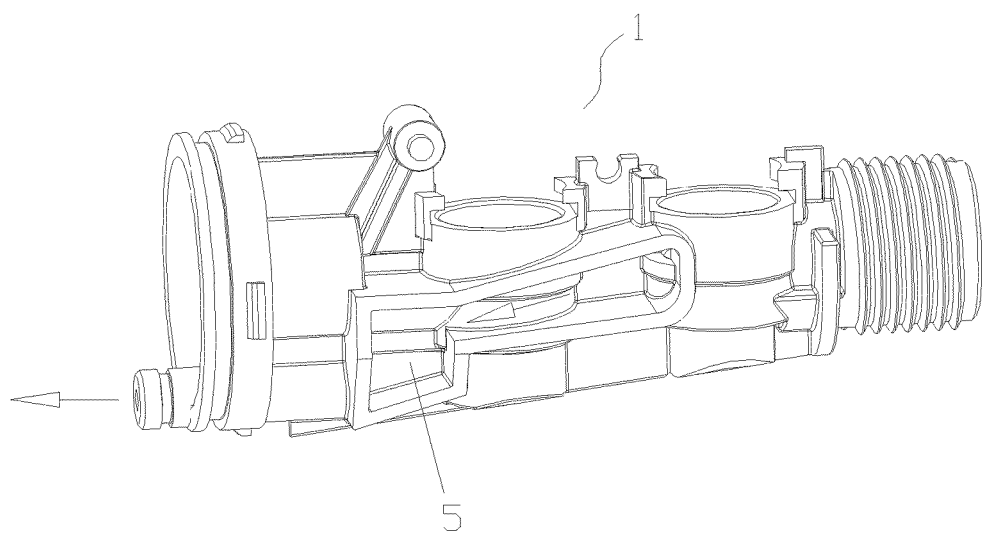
FIG. 8 is a rear view of a water output valve body of a water output device according to the first embodiment of the present invention.

The purpose, construction, features, functions and advantages of the present invention can be appreciated and understood more thoroughly through the following detailed description with reference to the attached drawings.

Firstly, refer to FIGS. 1 to 10 for the technical details of a two-route switching water output system of the present invention. As shown in FIGS. 1 to 10, the two-route switching water output system includes a water input converter a and a water output device c. The water input converter a includes a water input valve body 19 and a valve cock 20. In the water input valve body 19 is provided with a first water input route A1 and a second water input route B1. One of the first water input route A1 and the second water input route B1 is switched to open or close through the valve cock 20. The water output device c includes a water output valve body 1, a control valve core 62, and an outer shell 2 disposed around the water output valve body 1. Inside the water output valve body 1 is provided with a first water output route A2 and a second water output route B2. The first water input route A1 and the first water output route A2 are connected and in communication with each other to form a first water route A. The second water input route B1 and the second water output route B2 are connected and in communication with each other to form a second water route B. The first water output route A2 is kept open, while the open and close of the second water output route B2 is controlled by the control valve core 62. The position of the valve cock 20 is adjusted by the water output device c through feedback of water pressure in the second water route B. When the second water output route B2 is cut off by the control valve core 62, the valve cock 20 is pushed by the water pressure in the second water input route B1 to move upward, to open first water input route A1. When the second water output route B2 is opened by the control valve core 62, the valve cock 20 is pushed by the water pressure in the first water input route A1 to move downward, to close first water input route A1.

When the second water output route B2 is cut off by the control valve core 62, the second water input route B1 exerts an upward water pressure on the valve cock 20, that is greater than the downward water pressure exerted on the valve cock 20 by the first water input route A1. Therefore, the water pressure of the second water input route B1 pushes the valve cock 20 to move upward, to open the first water input route A1. When the second water output route B2 is opened by the control valve core 62, due to the release of pressure, and the downward water pressure on the valve cock 20 by the first water input route A1, such that the water pressure in the first water input route A1 pushes the valve cock 20 to move downward, to close the first water input route A1.

In the various embodiment of the present invention, the first water input route A1 is formed by a first water input channel 251 on the upper portion of the water input valve body 19, and a first middle water output channel 241; while the second water input route B1 is formed by a second water input channel 252 on the lower portion of the water input valve body 19, and a second middle water output channel 242. The valve cock 20 is placed between the first middle water output channel 241 and second middle water output channel 242 connected and in communication with each other. When the valve cock 20 is at a position of the upper stop point, the first water input channel 251 and the first middle water output channel 241 are connected and in communication with each other. When the valve cock 20 is at the position of the lower stop point, the second water input channel 252 and the second middle water output channel 242 are connected to and in communication with each other. Further, the first middle water output channel 241 and the second middle water output channel 242 are vertically disposed, and are connected to each other through a middle channel 24. The first water input channel 251 and the second water input channel 252 are disposed laterally and are not connected to each other.

In the various embodiments of the present invention, on the upper end of the valve cock 20 is provided with a first protrusion ring portion 21, that is provided with a first ring slot 211. In the first ring slot 211 is provided with a first O-shape seal ring 27 blocking the first water input channel 251 and the first middle water output channel 241. When the second water output route B2 of the water output device c is opened, the valve cock 20 is kept at the position of its lower stop point due to its own weight, the water pressure difference in the first water route A, and the downward thrust of water flow in the second water route B. At this time, the first O-shape seal ring 27 blocks the first water input channel 251 and the second middle water output channel 242, such that the first water input route A1 formed by the first water input channel 251 and the second middle water output channel 242 is closed.

In the various embodiments of the present invention, in the central portion of the valve cock 20 is provided with a central protrusion ring portion 23, in which is provided with a central ring slot 231. In the central ring slot 231 is provided with a central O-shape seal ring 26 separating and blocking the first middle water output channel 241 and the second middle water output channel 242. Regardless the valve cock 20 is moving upward or downward, the central O-shape seal ring 26 reliably separates and divides the first middle water output channel 241 and the second middle water output channel 242.

In the various embodiments of the present invention, in order to make the valve cock 20 move downward quickly when the control valve core 62 is opened, the cross section of the central protrusion ring portion 23 is greater than that of the first protrusion ring portion 21. When the control valve core 62 is opened, the downward force exerted by the water flow of the first water input route A1 on the central protrusion ring portion 23 is greater than the upward force exerted by the water flow of the first water input route A1 on the first protrusion ring portion 21. Namely, the first water input route A1 exerts downward water pressure on the valve cock 20.

In the various embodiments of the present invention, on the lower end of the valve cock 20 is provided with a second protrusion ring portion 22, and that is provided with a second ring slot 221. In the second ring slot 221 is provided with a one way seal ring 28 blocking the second water input channel 252 and the second middle water output channel 242. When the second water output route B2 of the water output device c is closed, the water pressure in the second middle water output channel 242 is increased steadily, such that this makes the one way seal ring 28 block the second water input channel 252 and the second middle water output channel 242, then it makes the valve cock 20 move upward to the position of the upper stop point and remain there. At this time, the first 0-shape seal ring 27 does not block the first water input channel 251 and the second middle water output channel 242, while the first water input route A1 formed by the first water input channel 251 and the second middle water output channel 242 is opened.

In the various embodiments of the present invention, a plurality of water holes 222 are provided evenly on the second protrusion ring portion 22 around the perimeter of the second ring slot 221. When water is output from the second water input route B1, the second water output route B2 of the water output device c is opened, the water coming in from the second water input channel 252 will press downward the outer rim of the one way seal ring 28 to retract gradually inward, such that water will flow from the water holes 222 into the second middle water output channel 242, and it will finally flow out from the second water output route B2 of the water output device c. When water is not output from the second water input route B1, namely, the second water output route B2 of the water output device c is closed, then after the water accumulated in the second middle water output channel 242 flows through the water holes 222, it will push the outer rim of the one way seal ring 28 upward to expand gradually outward, as such the water pressure in the second middle water output channel 242 will push the valve cock 20 to move upward gradually, till it reaches the position of the upper stop point.

In the various embodiments of the present invention, in the lower end of the second middle water output channel 242 is provided with sleeve 29 for positioning the lower stop point of the valve cock 20. The lower end of the sleeve 29 is provided with step face in cooperation with the positioning of the water input valve body 19. The outer perimeter of the sleeve 29 and the inner side of the second middle water output channel 242 are in interference fit or thread gap fit. During installation, the valve cock 20 is placed in from the lower end of the second middle water output channel 242 of the water input valve body 19, and then install the sleeve 29. In the water input valve body 19 is provided with the steps 191 for positioning the upper stop point of the valve cock 20. The valve cock 20 is pushed by the water pressure in the second middle water output channel 242 to move upward, until the upper end surface of the central protrusion ring portion 22 is pressed against the steps 191. The steps 191 are located above the middle channel 24.

In the various embodiments of the present invention, in order to facilitate connecting to the input water, the water input ports of the first water input channel 251 and the second water input channel 252 are each provided with an outer thread connector 192, and of course it can be an inner thread connector. Also, in order to facilitate connecting to output water, the water output ports of the first middle water output channel 241 and the second middle water output channel 242 are each provided with an outer thread connector 192, and of course it can be an inner thread connector. The first water input route A1 is a faucet water route, while the second water input route B1 is a purified water route. The faucet water and the purified water can be supplied continuously as input water to the output water converter, but only one is selected as the output water. To be more specific, the control valve core 62 of the water output device c is used to switch and determine whether the output water is faucet water or purified water by means of the feedback of water pressure through the second water output route B2 to the water input converter.

Embodiment 1

As shown in FIGS. 5 to 8, at the water input end of the water output valve body 1 is provided axially with a first middle water input channel 31 and the second middle water input channel 32. At the water output end of the water output valve body 1 is provided axially with a first water output channel 4 and a second water output channel 5. The water output valve body 1 is provided axially with a first valve slot 11 and a second valve slot 12 in parallel. The first middle water input channel 31 is connected and in communication with first water output channel 4 through a first valve slot 11, to form the first water output route A2. The first water output channel 4 includes a first inner water output channel 41 and a first outer water output channel 42 disposed concentrically. In the first valve slot 11 is provided with a switching valve core 61 to control connecting to one of the following: the first middle water input channel 31, the first inner water output channel 41, the first outer water output channel 42. The second middle water input channel 32 is connected and in communication with the second water output channel 5 through the second valve slot 12 to form a second water output route B2. The control valve core 62 is provided in the second valve slot 12 to control the open or close of the second water output route B2.

In embodiment 1, the second middle water input channel 32 is disposed in the first middle water input channel 31, and of course both can be disposed in parallel. The first water output route A2 is a faucet water route, while the second water output route B2 is a purified water route, but the present invention is not limited to this, any two different water flows are suitable to apply. The water output end of the water output valve body 1 is provided with a water output head 7. The faces of the water output head 7 and the water output valve body 1 cooperating with each other are each provided with an O-shape seal ring. The first inner water output channel 41 and the first outer water output channel 42 are disposed concentrically in the water output head 7. In the first inner water output channel 41 is provided with a water softening device 10 to treating water into soft water. In the first outer water output channel 42 is provided with a water output panel 13 having a ring of water output holes to form into a shower.

In embodiment 1, in a top portion of the first valve slot 11 is provided with a first valve seat 81 in cooperation with the switching valve core 61. In the bottom portion of the first valve slot 11 is provided with a first spring 91 capable of restoring the switching valve core 61 into its original position quickly. In a top portion of the second valve slot 12 is provided with a second valve seat 82 in cooperation with the control valve core 62. In the bottom portion of the second valve slot 12 is provided with a second spring 92 capable of restoring the control valve core 62 quickly into its original position. In order to ensure reliable tight seal, for the face of the water output valve body 1 acting in cooperation with the faces of the first valve seat 81 and the second valve seat 82, all such faces are provided with O-shape seal rings. Also, for the face of the switching valve core 61 acting in cooperation with the faces of the first valve seat 81 and the water output valve body 1, all such faces are provided with O-shape seal rings. Further, for the face of the control valve core 62 acting in cooperation with the faces of the second valve seat 82 and the water output valve body 1, all such faces are provided with O-shape seal rings.

In embodiment 1, the upper end of the switching valve core 61 is connected to the upper end of the control valve core 62 through a lever 14. The central portion of the lever 14 is movably installed on the water output valve body 1. The other end of the lever 14 is inserted into the switching slot at the upper end of the switching valve core 61. The height of the switching slot is greater than the height of the other end of the lever 14, while the other end of the lever 14 is fastened into a shrink neck portion at the upper end of the control valve core 62. The upper end of the control valve core 62 is provided with an on/off button 15 exposing out of the surface of the outer shell 2. The upper end of the switching valve core 61 and a lower side at one end of the switch button 16 are hinge-connected. The central portion at the lower end of the switch button 16 and the water output valve body 1 are hinge-connected, while the other end of the switch button 16 is not connected. In order to facilitate connection of the device to the water output converter, the water input end of the water output valve body 1 is provided with an outer thread connector 17.

The operation principle of the embodiment 1 is as follows: when the on/off button 15 is pressed, the second water output route B2 is connected to output the purified water, while the water output converter connected to the water input end of the water output valve body 1 is closed for the faucet water. At this time, faucet water is not output from the first water output route A2. When the hinge-connected end of switch button 16 is pressed, the on/off button 15 is restored to its original position under the action of a lever 14, such that the second water output route B2 is closed and no purified water is output, while the faucet water is output through the water output converter connected to the water input end of the water output valve body 1. At this time, faucet water is output from the first water output route A2. When the other end of the switch button 16 not connected is pressed, the faucet water is switched from soft water to shower water.

Embodiment 2

Figure 9:
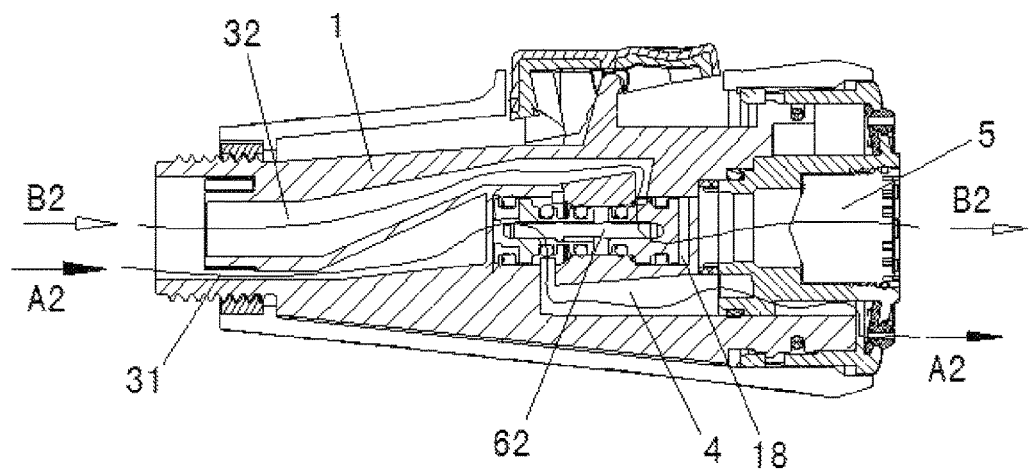
FIG. 9 is a schematic diagram of a water output device according to the second embodiment of the present invention.

As shown in FIG. 9, at the water input end of the water output valve body 1 is provided axially with a first middle water input channel 31 and the second middle water input channel 32. At the water output end of the water output valve body 1 is provided axially with a first water output channel 4 and a second water output channel 5. On the water output valve body 1 is provided axially with a valve slot 18. The first middle water input channel 31 is connected and in communication with the first water output channel 4 through the valve slot 18, to form the first water output route A2. The second middle water input channel 32 is connected and in communication with the second water output channel 5 through the valve slot 18 to form a second water output route B2. The control valve core 62 is provided in the valve slot 18 to control the open or close of the second water output route B2, while keeping the first water output route A2 connected. The operation of the second embodiment 2 is the same as the first embodiment 1, thus it will not be repeated here for brevity.

Embodiment 3

Figure 10:
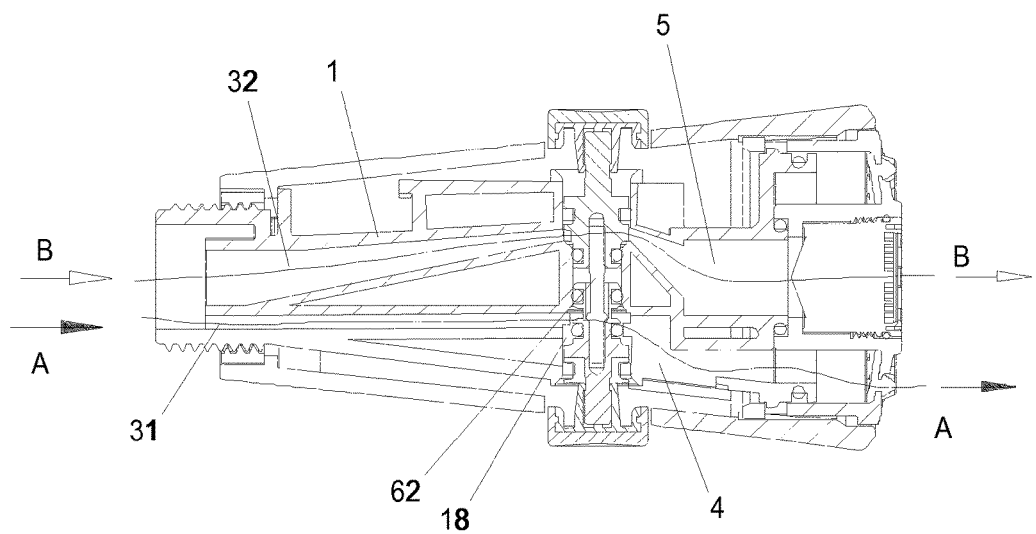
FIG. 10 is a schematic diagram of a water output device according to the third embodiment of the present invention.

As shown in FIG. 10, at the water input end of the water output valve body 1 is provided axially with a first middle water input channel 31 and the second middle water input channel 32. At the water output end of the water output valve body 1 is provided axially with a first water output channel 4 and a second water output channel 5. On the water output valve body 1 is provided axially with a valve slot 18. The first middle water input channel 31 is connected and in communication with first water output channel 4 through the valve slot 18, to form the first water output route A2. The second middle water input channel 32 is connected and in communication with the second water output channel 5 through the valve slot 18 to form a second water output route B2. The control valve core 62 is provided in the valve slot 18 to control the open or close of the second water output route B2, while keeping the first water output route A2 connected. The operation of the third embodiment 3 is the same as the first embodiment 1, such that it will not be repeated here for brevity.

Figure 11:
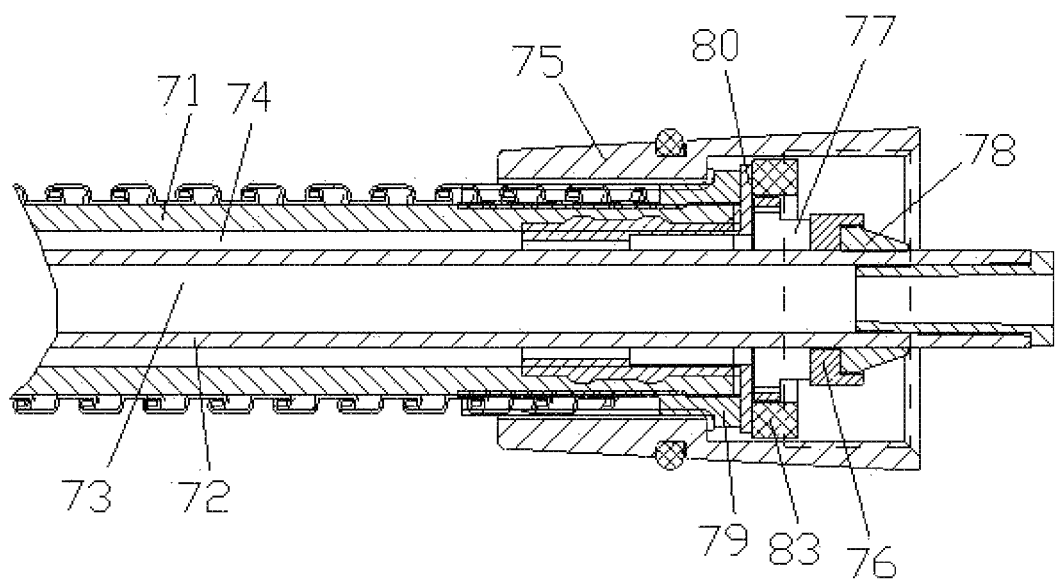
FIG. 11 is a schematic diagram of a water input tube according to the present invention.
Figure 12:
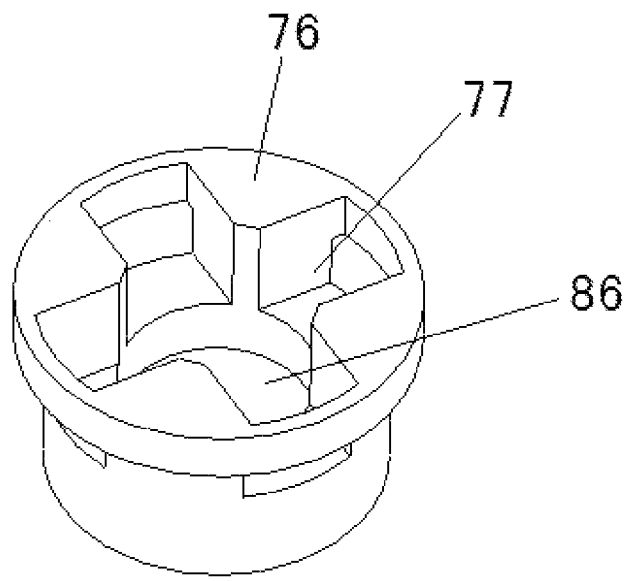
FIG. 12 is a schematic diagram of a water dividing valve core of a water input tube according to the present invention.
Figure 13:
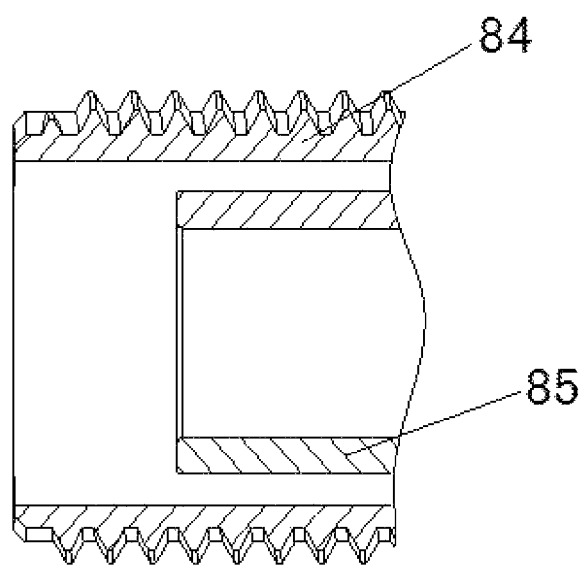
FIG. 13 is a schematic diagram of a water input end of a water output device according to the present invention.

As shown in FIGS. 11 to 13, the water input converter a is connected to the water output device c through the water input tube b. The water input tube b includes an inner tube 72, and an outer tube 71 sleeved around the inner tube 72. A cavity between the inner tube 72 and an outer tube 71 is formed into a first water transport channel 73. The cavity in the inner tube 72 is formed into a second water transport channel 74. The first water input route A1 is connected to the first water output route A2 through the first water transport channel 73, while second water input route B1 is connected to the second water output route B2 through the second water transport channel 74. In the present invention, the water input tube b is reasonable in design, and novel in structure, to combine two different water input channels into one water input tube b. As such, it has the advantages of compact structure, easy connection, and tight seal.

In the various embodiments, around the outer perimeter at the two ends of the outer tube 71 are provided each with a connection sleeve 75. In the connection sleeve 75 is provided with a water dividing valve core 76 at the end of the outer tube 71. In the center of the water dividing valve core 76 is provided with through holes 86 penetrating and forming in tight seal fit with the inner tube 72. After penetrating the through hole 86, the inner tube 72 is inserted into the second middle water input channel 32 to form tight seal fit. Around the perimeter of the water dividing valve core 76 is provided with a water output port 77 connected and in communication with the first water transport channel 73 and first middle water input channel 31.

In the various embodiments, a water output end of the water input tube b is connected to a water input end of the water output device c. The water input end of the water output device c is provided with an outer interface 84 having outer threads, and an inner interface 85 inside the outer interface 84. The inner cavity of the inner interface 85 leads to the second water output route B2 in the water output device c. The ring shape cavity between the outer interface 84 and the inner interface 85 leads to the first water output route A2 in the water output device c.

In the present embodiment, the front end of the water dividing valve core 76 is provided with a cone shape seal ring 78 wrapped around the inner tube 72. The small hole of the cone shape seal ring 78 is faced toward the water output device c. The inner cavity of the connection sleeve 75 is of a stepped hole structure. In the big hole at the front end of the connection sleeve 75 is provided with inner threads. The outer perimeter at the end portion of the outer tube 71 is provided with protrusion ring 79 in cooperation with the steps in the small hole at the rear end of the connection sleeve 75.

In the present embodiment, the front end of the outer tube 71 is provided with ring shape position restriction plate 80 bending axially outward. The perimeter of the water dividing valve core 76 is provided with a second seal ring 83 at the front end of the ring shape position restriction plate 80. When the connection sleeve 75 acts in rotation cooperation with the outer interface 84, through the protrusion ring 79, the outer tube 71 is pushed to connect to the outer interface 84, while the inner tube 72 is pushed to connect to the inner interface 85. The end portion of the outer interface 84 presses tightly the second seal ring 83, to make the outer interface 84 and outer tube 71 to connect into tight seal; while end portion of the inner interface 85 presses tightly the cone shape seal ring 78, to make the inner interface 85 and inner tube 72 to connect into tight seal.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A two-route switching water output system, comprising:
  a water input converter, including a water input valve body and a valve cock, wherein in the water input valve body is provided with a first water input route and a second water input route, one of the first water input route and the second water input route is switched to open or close through the valve cock; and
  a water output device, including a water output valve body and a control valve core, wherein inside the water output valve body is provided with a first water output route and a second water output route,
  wherein, the first water input route and the first water output route are connected and in communication with each other to form a first water route, the second water input route and the second water output route are connected and in communication with each other to form a second water route,
  the first water output route is kept open, while the open and close of the second water output route is controlled by the control valve core,
  a position of the valve cock is adjusted by the water output device through a water pressure feedback in the second water route, when the second water output route is cut off by the control valve core, the valve cock is pushed by water pressure in the second water input route to move upward, to open the first water input route, and when the second water output route is opened by the control valve core, the valve cock is pushed by water pressure in the first water input route to move downward, to close the first water input route;
  wherein the first water input route is formed by a first water input channel on an upper portion of the water input valve body, and a first middle water output channel; while the second water input route is formed by a second water input channel on a lower portion of the water input valve body, and a second middle water output channel, the valve cock is placed between the first middle water output channel and second middle water output channel in communication with each other, when the valve cock is at an upper stop point, the first water input channel and the first middle water output channel are connected and in communication with each other;

wherein on an upper end of the valve cock is provided with a first protrusion ring portion, that is provided with a first ring slot, in the first ring slot is provided with a first O-shape seal ring separating and blocking the first water input channel and the first middle water output channel, in a central portion of the valve cock is provided with a central protrusion ring portion, in which is provided with a central ring slot, in the central ring slot is provided with a central O-shape seal ring separating and blocking the first middle water output channel and the second middle water output channel, while a cross section of the central protrusion ring portion is greater than that of the first protrusion ring portion.

2. The two-route switching water output system as claimed in claim 1, wherein at a water input end of the water output valve body is provided with a first middle water input channel and a second middle water input channel, at a water output end of the water output valve body is provided with a first water output channel and a second water output channel, on the water output valve body is provided with a valve slot, the first middle water input channel is connected and in communication with first water output channel through the valve slot, to form the first water output route, the second middle water input channel is connected and in communication with the second water output channel through the valve slot, to form the second water output route, the control valve core is disposed in the valve slot, to control open and close of the second water output route, while keeping the first water output route connected.

3. The two-route switching water output system as claimed in claim 1, wherein at a water input end of the water output valve body is provided with a first middle water input channel and a second middle water input channel, at a water output end of the water output valve body is provided with a first water output channel and a second water output channel, on the water output valve body is provided with a first valve slot and a second valve slot, the first middle water input channel is connected and in communication with first water output channel through the first valve slot, to form the first water output route, the second middle water input channel is connected and in communication with the second water output channel through the second valve slot, to form the second water output route, the control valve core is disposed in the second valve slot, to control open and close of the second water output route.

4. The two-route switching water output system as claimed in claim 3, wherein the first water output channel includes concentrically disposed a first inner water output channel and a first outer water output channel, in the first valve slot is disposed a switching valve core controlling selection of one of following to connect: the first middle water input channel, the first inner water output channel, and the first outer water output channel.

5. The two-route switching water output system as claimed in claim 2, wherein the second middle water input channel is disposed in the first middle water input channel.

6. The two-route switching water output system as claimed in claim 3, wherein the second middle water input channel is disposed in the first middle water input channel.

7. The two-route switching water output system as claimed in claim 4, wherein the second middle water input channel is disposed in the first middle water input channel.

8. The two-route switching water output system as claimed in claim 1, wherein the water input converter is connected to the water output device through a water input tube, the water input tube includes an inner tube, and an outer tube sleeved around the inner tube, a cavity between the inner tube and the outer tube is formed into a first water transport channel, the cavity in the inner tube is formed into a second water transport channel, the first water input route is connected to the first water output route through the first water transport channel, while the second water input route is connected to the second water output route through the second water transport channel.

* * * * *